United States Patent [19]

Miyake et al.

[11] 4,117,512
[45] Sep. 26, 1978

[54] APPARATUS FOR PROVIDING A VIDEO MONTAGE TO A TELEVISION PICTURE IMAGE

[75] Inventors: Kazuhiko Miyake; Bunkichi Yamada, both of Kawasaki, Japan

[73] Assignee: Tokyo Shibaura Electric Co., Ltd., Kawasaki, Japan

[21] Appl. No.: 774,122

[22] Filed: Mar. 3, 1977

[30] Foreign Application Priority Data

Mar. 5, 1976 [JP] Japan .................................. 51/23137

[51] Int. Cl.$^2$ .............................................. H04N 5/22
[52] U.S. Cl. ..................................................... 358/183
[58] Field of Search ................................ 358/181, 183

[56] References Cited
U.S. PATENT DOCUMENTS

| | | | |
|---|---|---|---|
| 2,784,246 | 3/1957 | Hurford | 358/183 |
| 3,006,993 | 10/1961 | Barndt | 358/183 |

*Primary Examiner*—Robert L. Richardson
*Attorney, Agent, or Firm*—Cushman, Darby & Cushman

[57] ABSTRACT

An apparatus for providing a video montage to a television picture image comprises first and second signal generators adapted to generate first and second signals in synchronism with the television horizontal and vertical scanning signals, respectively, first and second signal combining circuits adapted to set those portions of the first and second signals corresponding to a horizontal blanking period at a reference level, a mixer for mixing outputs of the first and second signal combining circuits, a clamping circuit for clamping the reference level portion of the output of the mixer at a predetermined clamp level, a slicer for slicing an output of the clamp circuit at a predetermined level width with the predetermined clamp level substantially at a midlevel to obtain a control signal so as to synthesize two channel video signals.

7 Claims, 12 Drawing Figures

APPARATUS FOR PROVIDING A VIDEO MONTAGE TO A TELEVISION PICTURE IMAGE

BACKGROUND OF THE INVENTION

This invention relates to an apparatus for imparting a specific effect to a television picture image, in which a plurality of television picture image signals are combined to produce one television picture image signal.

There is developed a technique of combining, for example, a black-dotted TV picture image A as shown in FIG. 1 and a hatched TV picture image B as shown in FIG. 2 to produce a combined picture image with the picture image A and B portions demarcated by a diagonal line as shown in FIG. 3. There is also developed a technique for combining a picture image A as shown in FIG. 1 and a picture image B as shown in FIG. 2 to produce a combined picture image signal consisting of a picture image A portion, picture image B portion and overlapped picture image portion C. Although a boundary line of the two picture images in the combined picture image signal is shown as a straight line as shown in FIGS. 3 and 4, it can be displayed in any other pattern. The combined TV picture image signal as shown in FIGS. 3 and 4 are obtained by combining a TV picture image A signal at one channel and TV picture image B signal at the other channel at a channel mixing circuit. In order to obtain a television picture image as shown in FIG. 3 a control signal may be so imparted to the channel mixing circuit, when a TV picture image A signal is switched to a TV picture image B signal during the portion of a horizontal scanning period as to permit a switching time to be sequentially shifted left (in a forward direction) from the end of the horizontal scanning period for each horizontal scanning. If the picture image A signal is momentarily switched to the picture image B signal, a combined picture image signal as shown in FIG. 3 is obtained having a single clear-cut boundary line between the picture image A portion and the picture image B portion. A gradual switching from the picture image A signal to the picture image B signal results in a combined picture image signal having an overlapped portion C, as shown in FIG. 4, between the picture image A portion and the picture image B portion. In this case, it is preferred that the overlapped picture image portion C of the combined picture image signal extend an equal distance toward each of the picture image A and B portions with a marginal corner-to-corner diagonal line as a center. In the conventional apparatus, however, such a marginal corner-to-corner diagonal line is displaced from the center of the two picture images, failing to obtain a desired composite picture image signal. If, for example, the overlapped portion C is displaced toward the picture image B portion, the picture image portion B is intruded by the overlapped picture image portion C and in consequence a correcting operation is necessary.

SUMMARY OF THE INVENTION

It is accordingly the object of this invention to provide an apparatus for providing a video montage to a television picture image, in which an excellent picture image can be obtained with a boundary line in a picture image remaining at the same position, even when a control signal to a channel mixing circuit varies in its amplitude.

According to this invention there is provided an apparatus for providing a video montage to a television picture image, comprising means for generating a fundamental wave signal for defining a boundary of picture images in a signal generated by combining a plurality of television signals, said fundamental wave signal having a predetermined portion set to a reference level, means for clamping the fundamental wave signal at a predetermined level utilizing the reference level of the fundamental wave signal; means for slicing the clamped signal at upper and lower levels with the predetermined clamp level substantially at a mid-level to obtain a control signal for use in synthesizing a plurality of television signals by the control signal.

DETAILED DESCRIPTION OF THE INVENTION

Figure 4:
FIG. 4 shows a picture image having two single TV picture image portions and an overlapped portion of the two single images.

An explanation will be made of the apparatus in FIG. 5 which combines a first-channel picture image shown in FIG. 1 and second-channel picture image shown in FIG. 2 to produce a combined television picture image with the two picture images overlapped as shown in FIG. 4.

Figure 6:
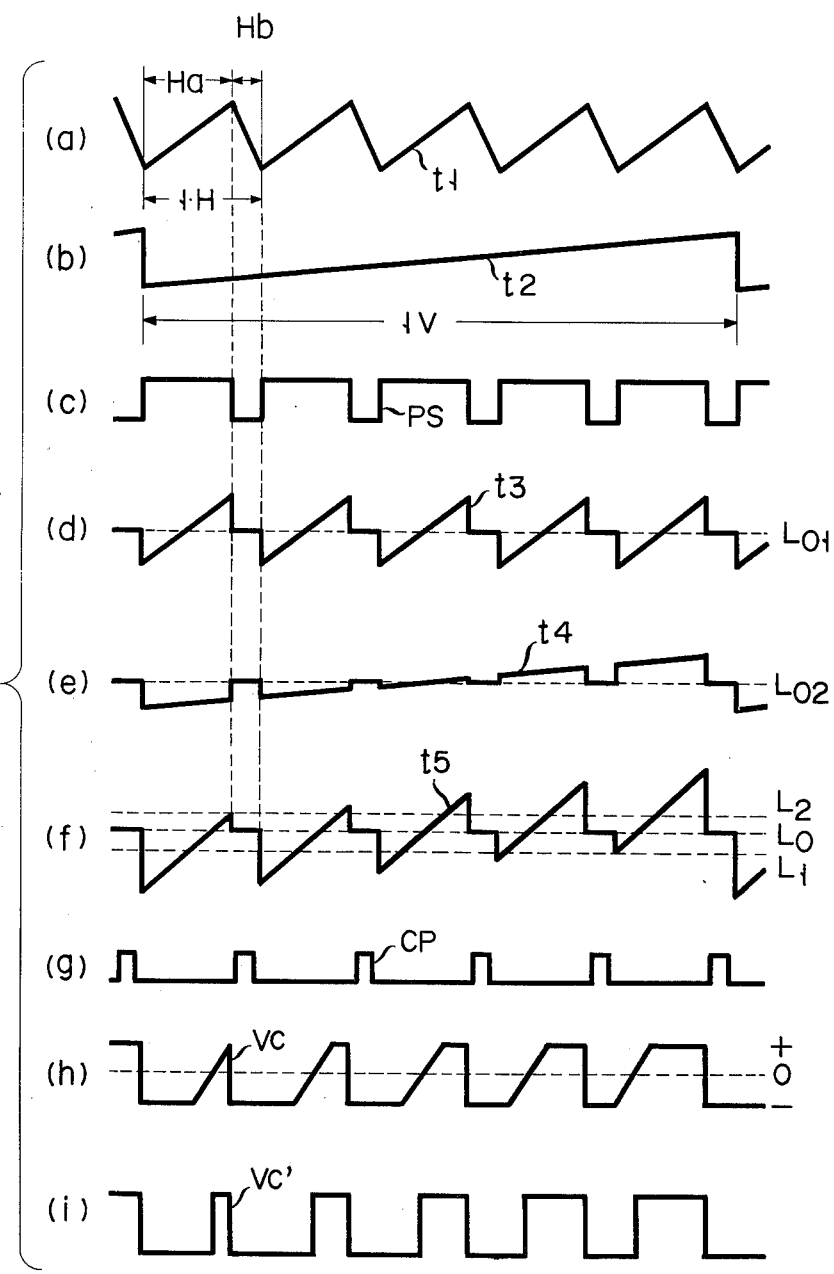
FIG. 6 shows signal waveforms for explaining the operation of the circuit shown in FIG. 5.
Figure 5:
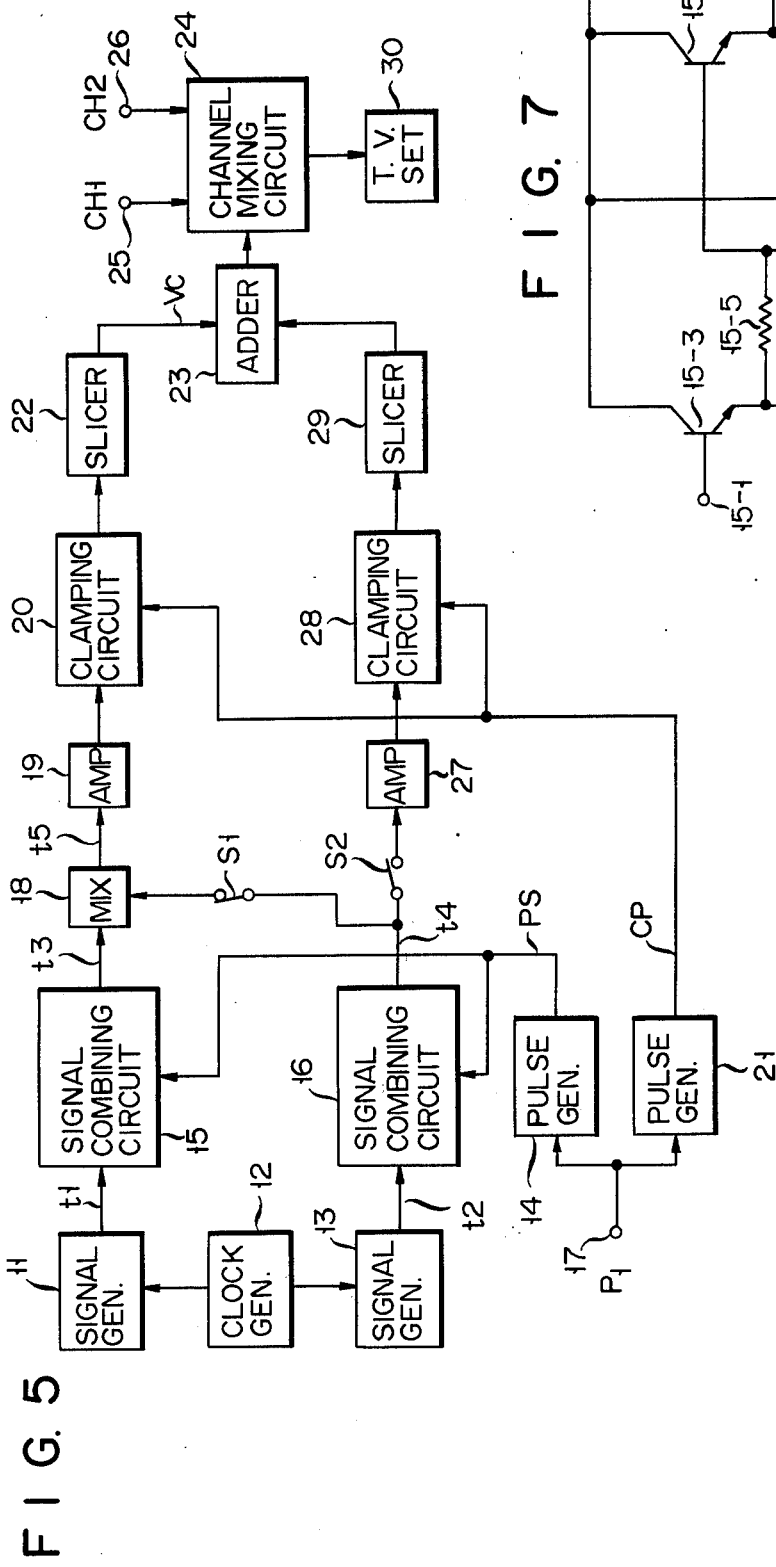
FIG. 5 is a circuit block diagram of an apparatus for imparting a specific effect to a television picture image in accordance with one embodiment of this invention.

In FIG. 5 a fundamental-wave signal generator 11 generates a saw-tooth wave $t_1$ with a horizontal scanning period of 1H as a repetition cycle, as shown in FIG. 6(a). Of one horizontal scanning line period 1H, Ha corresponds to a horizontal scanning period and Hb to a blanking period. The saw-tooth wave $t_1$ is generated in synchronism with a horizontal synchronizing signal from a clock pulse generator 12. Another fundamental-wave signal generator 13 generates a saw-tooth wave $t_2$ with a vertical scanning period of 1V as a repetition cycle, as shown in FIG. 6(b). The saw-tooth wave $t_2$ is generated in synchronism with a vertical synchronizing signal from the clock pulse generator 12. The fundamental wave $t_1$ from the signal generator 11 is supplied, together with a reference pulse PS from a pulse generator 14, to a signal combining circuit 15 and the fundamental wave $t_2$ from the signal generator 13 is delivered, together with the reference pulse PS from the pulse generator 14, to a signal combining circuit 16. The pulse generator 14 is driven by a horizontal blanking pulse $P_1$, which is supplied to an external signal input terminal 17 in synchronism with the above-mentioned horizontal blanking period, and generates a reference pulse PS in synchronism with the horizontal blanking period Hb as shown in FIG. 6(c).

The signal combining circuit 15 combines the fundamental wave $t_1$ shown in FIG. 6(a) and the reference pulse PS (FIG. 6(c)) from the pulse generator 14 to generate a signal $t_3$ as shown in FIG. 6(d). The construction and operation of the signal combining circuit 15 will be explained in more detail by referring to FIG. 7.

Figure 7:
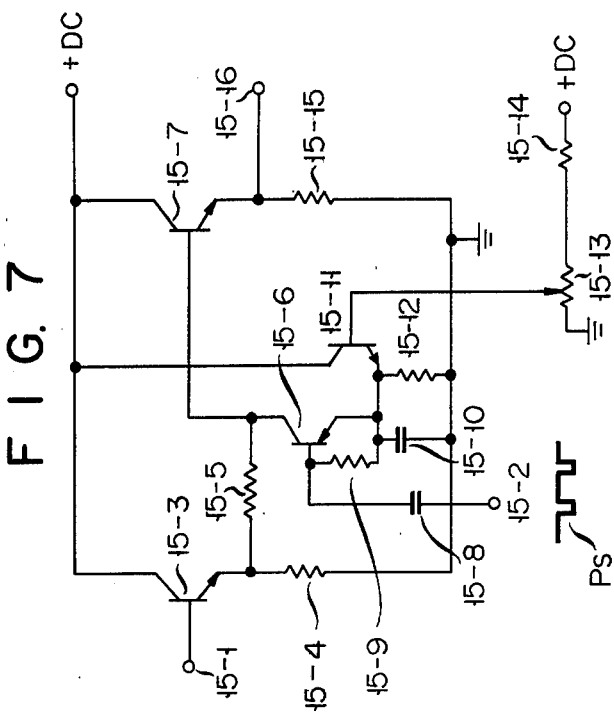
FIG. 7 is a concrete circuit diagram of a signal combining circuit shown in FIG. 5.

In the circuit shown in FIG. 7 the fundamental wave $t_1$ is supplied to an input terminal 15-1 and the reference pulse PS is fed to an input terminal 15-2. The input terminal 15-1 is connected to the base of a transistor 15-3. The transistor 15-3 has a collector connected to a DC positive power source +DC and an emitter connected to ground through a bias resistor 15-4 and to the collector of a transistor 15-6 and base of a transistor 15-7 respectively through a resistor 15-5. The base of the transistor 15-6 is connected to the input terminal 15-2 through a capacitor 15-8 and to the emitter of the transistor 15-6 through a resistor 15-9. The emitter of the transistor 15-6 is grounded through a capacitor 15-10 and connected to the emitter of the transistor 15-11. The emitter of the transistor 15-11 is grounded through a resistor 15-12 and the collector of this transistor is connected to the DC positive power source +DC. The base of the transistor 15-11 is connected to a slider of a potentiometer 15-13. One fixed terminal of the potentiometer 15-13 is connected through a resistor 15-14 to the DC positive power source and the other grounded. The transistor 15-7 has a collector connected to the DC positive power source +DC and an emitter grounded through a resistor 15-15 and connected to an output terminal 15-16.

Figure 3:
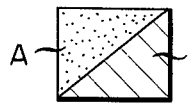
FIG. 3 shows a combined TV picture image having a single clear-cut boundary line by combining picture images shown in FIGS. 1 and 2.

When the reference pulse PS applied to the input terminal 15-2 is at a high level, the transistor 15-6 is turned OFF and at a low level the transistor 15-6 is turned ON. In consequence, when the reference pulse PS is at a high level, a waveform, corresponding to the horizontal scanning period H$a$ of the fundamental wave, which is inputted to the input terminal 15-1 appears at the output terminal 15-16. When the reference pulse PS is at a low level, the transistor 15-6 is turned ON and a potential on a junction between the resistor 15-12 and the emitter of the transistor 15-11 is transmitted through the transistor 15-6 to the base of the transistor 15-7. A voltage across the resistor 15-12 is determined by the magnitude of a conducting current through the transistor 15-11 which is determined by a base bias applied to the base of the transistor 15-11. When the boundary line of picture images A and B is positioned at a diagonal line as shown in FIGS. 3 and 4, the potentiometer 15-13 is so adjusted that the output corresponding to the blanking period H$b$ is at a reference level $L_{01}$ substantially equal to the mid-level of an output appearing at the output terminal throughout the horizontal scanning period H$a$. If in this case the fundamental wave $t_1$ is applied to the input terminal 15-1 and the reference pulse PS to the input terminal 15-2, a synthesized output signal $t_3$ with the reference level $L_{01}$ as shown in FIG. 6(d) appears from the output terminal 15-16.

The signal combining circuit 16 is so constructed as shown in FIG. 7. When the fundamental wave $t_2$ is applied to the input terminal 15-1 and the reference pulse PS to the input terminal 15-2, a synthesized output signal $t_4$ with a reference level $L_{02}$ as shown in FIG. 6(e) emerges from the output terminal 15-16.

Upon closure of a switch S1 the resultant synthesized output signals $t_3$ and $t_4$ are mixed at a mixer 18 and a synthesized reference wave $t_5$ as shown in FIG. 6(f) is produced from the mixer 18. The synthesized fundamental wave $t_5$ is, after amplified at an amplifier 19, to a clamping circuit 20. The clamping circuit 20 clamps an input signal from the amplifier 19 based on a clamping pulse CP as shown in FIG. 6(g) which is generated from a pulse generator 21 according to a horizontal blanking pulse P1 during the horizontal blanking period of the television signal. The clamping level is set at a clamp level $L_0$ as shown in FIG. 6(f). The synthesized fundamental wave $t_5$ clamped to the clamp level $L_0$ is fed to a slicer 22 and a slice level provided by the slicer is set to lower and upper levels $L_1$ and $L_2$ with the clamp level $L_0$ substantially at the center. In consequence, a signal component as defined between the levels $L_1$ and $L_2$ is extracted, as an output wave shown in FIG. 6(h), from the slicer 22. The output signal of the slicer 22 is supplied through an adder 23 to a channel mixing circuit 24 and acts as a control signal $V_c$ for mixing two television channel signals CH1 and CH2 being supplied to terminals 25 and 26. The amplifier 19, clamping circuit 20 and slicer 22 constitutes a first signal processing circuit and an amplifier 27, clamping circuit 28 and slicer 29 constitutes a second signal processing circuit. Upon closure of a switch S2 the output of the second signal processing circuit is delivered to the adder 23 in the case of a different specific effect. The following explanation is based on the assumption that the switch S2 is opened and that only a control signal Vc from the slicer 22 is applied to the adder 23.

Figure 1:
FIGS. 1 and 2 show different TV picture images.
Figure 2:

A television signal corresponding to a picture image A in FIG. 1 is supplied as a CH1 signal to the input terminal 25 of the channel mixing circuit 24 and a television signal corresponding to a picture image B in FIG. 2 is fed as a CH2 signal to the input terminal 26 of the channel mixing circuit 24. If the control signal Vc from the adder 23 has a slantingly rising waveform as shown in FIG. 6(h), a television receiver produces a picture image including a mixed image C, i.e., a combination of the picture images A and B, as shown in FIG. 4. If a pulse having its slanting portion substantially vertically raised is obtained as a control signal Vc' by increasing the gain of the amplifier 19 of FIG. 5, the television receiver 30 produces a combined picture image in which a boundary between the picture images A and B constitutes one diagonal line.

One concrete form of the channel mixing circuit 24 in FIG. 5 will be explained by referring to FIGS. 8 and 9.

Figure 8:
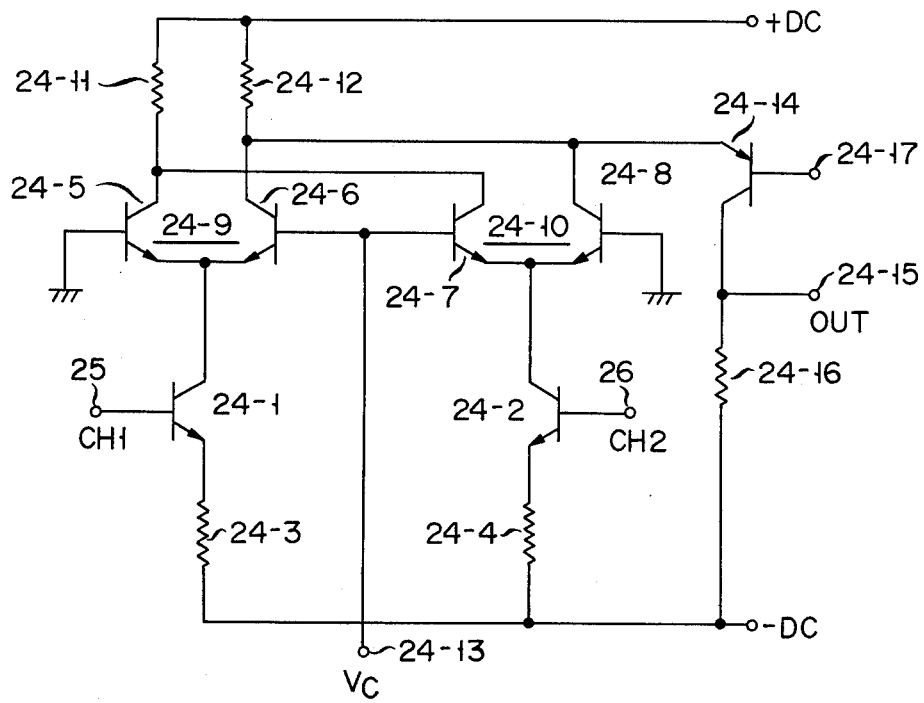
FIG. 8 is a concrete circuit diagram of a channel mixing circuit shown in FIG. 5.
Figure 9:
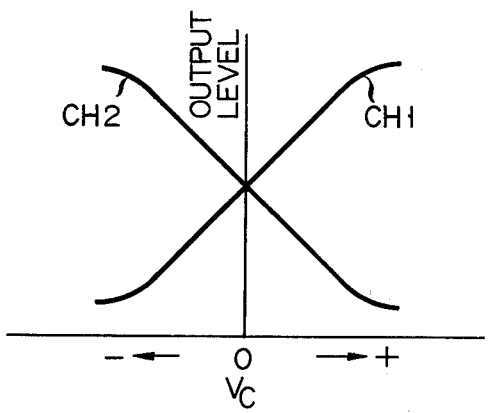
FIG. 9 is a graph showing a characteristic of the operation of the circuit shown in FIG. 8.

In the circuit shown in FIG. 8 video signal input terminals 25 and 26 are connected to the bases of transistors 24-1 and 24-2, respectively. The emitters of the transistors 24-1 and 24-2 are connected respectively through resistors 24-3 and 24-4 to a DC negative power source −DC. The collector of the transistor 24-1 is connected to a common junction between emitters of transistors 24-5 and 24-6 and the collector of the transistor 24-2 to a common junction between emitters of transistors 24-7 and 24-8. The transistors 24-5 and 24-6 constitute a differential amplifier 24-9 and the transistors 24-7 and 24-8 another differential amplifier 24-10.

The collectors of the transistors 24-5 and 24-6 in the differential amplifier 24-9 are connected respectively through resistors 24-11 and 24-12 to a DC positive power source +DC and the collectors of the transistors 24-7 and 24-8 in the differential amplifier 24-10 is connected respectively through the resistors 24-11 and 24-12 to the DC positive power source +DC. The bases of the transistors 24-5 and 24-8 are grounded. The bases of the transistors 24-6 and 24-7 are connected to an input terminal 24-13 to which the control signal Vc is supplied. The collectors of the transistors 24-6 and 24-8 are connected to the emitter of the transistor 24-14. The collector of the transistor 24-14 is connected to an output terminal 24-15 and through a resistor 24-16 to the DC negative power source −DC. A suitable DC voltage for adjusting an output level on the output terminal 24-15 is externally applied to a base terminal 24-17 of the transistor 24-14.

The operation of the circuit in FIG. 8 will now be explained below in conjunction with a graph in FIG. 9.

A current corresponding to the signal CH1 flows at the collector of the transistor 24-1. This current is supplied from the emitters of the transistors 24-5 24-6. At the collector of the transistor 24-2 a current corresponding to the signal CH2 also flows from the emitters of the transistors 24-7, 24-8.

When the control signal Vc to the terminal 24-13 is at a zero level, the base inputs of the transistors 24-5 and 24-6 become a zero level and at the same time the base inputs of the transistors 24-7 and 24-8 become a zero level. As a result, the operation condition of the transistors 24-5, 24-6, 24-7 and 24-8 is balanced and the TV signals CH1 and CH2 applied to the terminals 25 and 26 emerge at the same level from the output terminal 24-15. As shown in FIG. 9 the output level curves of the TV signals CH1, CH2 cross at Vc=0. When the control signal Vc is at a positive level, the conducting current of the transistor 24-6 is increased and the conducting current of the transistor 24-7 is also increased and the conducting current of the transistor 24-8 is decreased. In consequence, as shown in FIG. 9 the output CH1 signal of the differential amplifier 24-9 through the transistor 24-6 is increased and the output CH2 signal of the differential amplifier 24-10 through the transistor 24-8 is decreased. When, on the other hand, the control signal Vc is at the negative level, the conducting current of the transistor 24-6 is decreased and the conducting current of the transistor 24-7 is decreased. In consequence, as shown in FIG. 9 the output CH1 signal component of the transistor 24-6 is decreased and the output CH2 signal component of the transistor 24-8 is increased. In this way, a gradual variation of the control signal in FIG. 6(h) from the negative to the positive level results in a gradual variation from 100% to 0% of a mixed ratio between the CH1 signal (B picture image) and the CH2 signal (A picture image). At the negative portion of the control signal the A picture image corresponding to the CH2 signal is predominant and at the positive portion of B picture image corresponding to the CH1 signal is predominant. Thus, a combined TV picture image is obtained having a mixed image portion as shown in FIG. 4.

Although according to this invention the clamp level of the fundamental wave signal is set at a level equal to substantially a mid-level of the slice level of the next stage slicer, even if, for example, the amplitude of the fundamental wave varies at the amplifier, the movement of the boundary of the two picture images A and B in the combined picture image can be prevented by selecting a relation between the clamp level and the slice level. The boundary position of the combined picture image can be arbitrarily moved by varying the reference level $L_{01}$ or $L_{02}$. This will be explained more in detail by referring to FIGS. 10 to 12.

Figure 10:
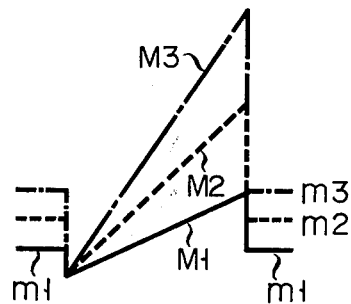
FIGS. 10 to 12 show signal waveforms for explaining the operation of the embodiment shown in FIG. 5.
Figure 11:
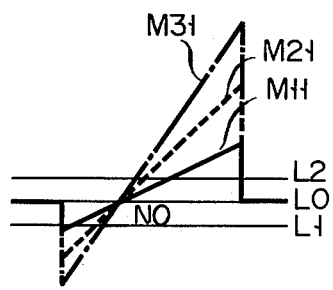
Figure 12:
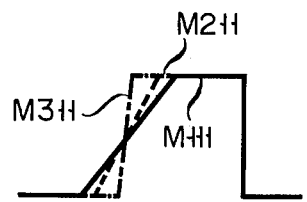

Suppose that in the embodiment shown in FIG. 5 the fundamental wave from the amplifier 19 is represented by a saw-tooth wave M1 in FIG. 10. $m1$ in the saw-tooth wave M1 is a reference level as added in the signal combining circuit 15. The saw-tooth wave M1 is varied as shown, for example, M2 and M3, by varying the gain of the amplifier 19. In FIG. 10 the reference levels of the saw-tooth waves M2 and M3 are represented by $m2$ and $m3$, respectively. If the saw-tooth waves M1, M2 and M3 are clamped at the levels $m1$, $m2$ and $m3$, then the corresponding fundamental waves are represented by M11, M21 and M31, respectively (FIG. 11). As will be evident from FIG. 11 the clamp level of each corresponding fundamental wave meets at the level $L_0$. If, therefore, the saw-tooth wave is sliced at the subsequent stage slicer 22 at the upper and lower slice levels $L_1$ and $L_2$ with the clamp level $L_0$ at the mid-level, a point (NO) on a boundary in a combined image always meets on the level $L_0$. In this case, the output of the slicer 22 has its slant rise portion varied as indicated by M11, M21 and M31 in FIG. 11 by the amplitude variation of the fundamental wave as produced at the amplifier 19. This means that the overlapped portion C of the two picture images A and B as shown in FIG. 4 is varied in its width, but a marginal center line as indicated by a dash line in FIG. 4 remains at the same position unlike the counterpart as obtained in the conventional apparatus.

Although in the embodiment shown in FIG. 5 the two saw-tooth waves produced from the two fundamental signal generators 11 and 13 are, after mixed at the mixer 15, subjected to signal treatment such as slicing etc. to obtain a control signal Vc, only one fundamental wave can be utilized for the formation of a control signal, through dependent upon the kind of a specific effect waveform. For example, a control signal can be formed using only the fundamental wave $t_1$ from the signal generator 11. In this case, the switches S1 and S2 in FIG. 5 are opened. Alternatively, a control signal can be formed by passing only the fundamental wave $t_2$ through the amplifier 27, clamping circuit 28 and slicer 29 with the switch S1 in the open state and the switch S2 in the closed state (FIG. 5).

In the above-mentioned embodiment the saw-tooth wave is used as a fundamental wave. Where as a boundary line of two pictures in a combined picture signal use is made of a folded line and a curvilinear line such as a lozenge on a circle in place of a straight line, however, a triangular wave, parabolic wave etc. can be used as the fundamental wave.

Although in the above-mentioned embodiment shown in FIG. 5 the signal combining circuit 15 is placed immediately before the mixer 18, it may be disposed at any position followed by the clamping circuit 20.

In the above-mentioned embodiment the control signal Vc is obtained through analog signal treatment. However, it can also be obtained by the treatment of digital signals.

What we claim is:

1. An apparatus for providing a video montage to a television picture image, comprising means for generating a fundamental wave signal for defining a boundary of picture images in a signal generated by combining a plurality of television signals, said fundamental wave signal having a predetermined portion set to a reference level; means for clamping the fundamental wave signal at a predetermined level utilizing the reference level of the fundamental wave signal; and means for slicing the clamped signal at upper and lower levels with the predetermined clamp level substantially at a mid-level to obtain a control signal for use in synthesizing a plurality of television signals by the control signal.

2. An apparatus according to claim 1, in which said fundamental wave signal generating means comprises a first signal generator for generating a first fundamental wave signal in synchronism with a television horizontal scanning signal, a second signal generator for generating a second fundamental wave signal in synchronism with a television vertical scanning signal, first and second signal combining circuits adapted to set corresponding portions of the horizontal blanking period of the first and second fundamental wave signals at predetermined reference levels, respectively, and a mixer for mixing output signals from said first and second signal combining circuits.

3. An apparatus according to claim 2, in which said first and second signal combining circuits are saw-tooth wave signal generators.

4. An apparatus according to claim 2, in which each of said first and second signal combining circuit comprises a first transistor for receiving the fundamental wave signal, an output stage transistor having a base to which an output of said first transistor is supplied, a variable refernce voltage source for supplying the reference-level signal to the base of the output stage transistor, and a switch transistor connected between the variable reference voltage source and the output stage transistor and adapted to receive a reference pulse signal.

5. An apparatus according to claim 4, in which said variable reference voltage source includes a resistor.

6. An apparatus according to claim 1, in which said apparatus further comprises a channel mixing circuit for use in synthesizing a plurality of television signals by the control signal.

7. An apparatus according to claim 6, in which said channel mixing circuit comprises first and second differential amplifiers adapted to generate output signals opposite in polarity to the control signal, first and second television signal inputting means coupled to said first and second differential amplifiers, respectively, and means for synthesizing outputs of said first and second differntial aplifiers to generate an output.

* * * * *